June 17, 1930.  R. W. GRISWOLD, 2D  1,763,888
AEROPLANE
Filed Nov. 11, 1927
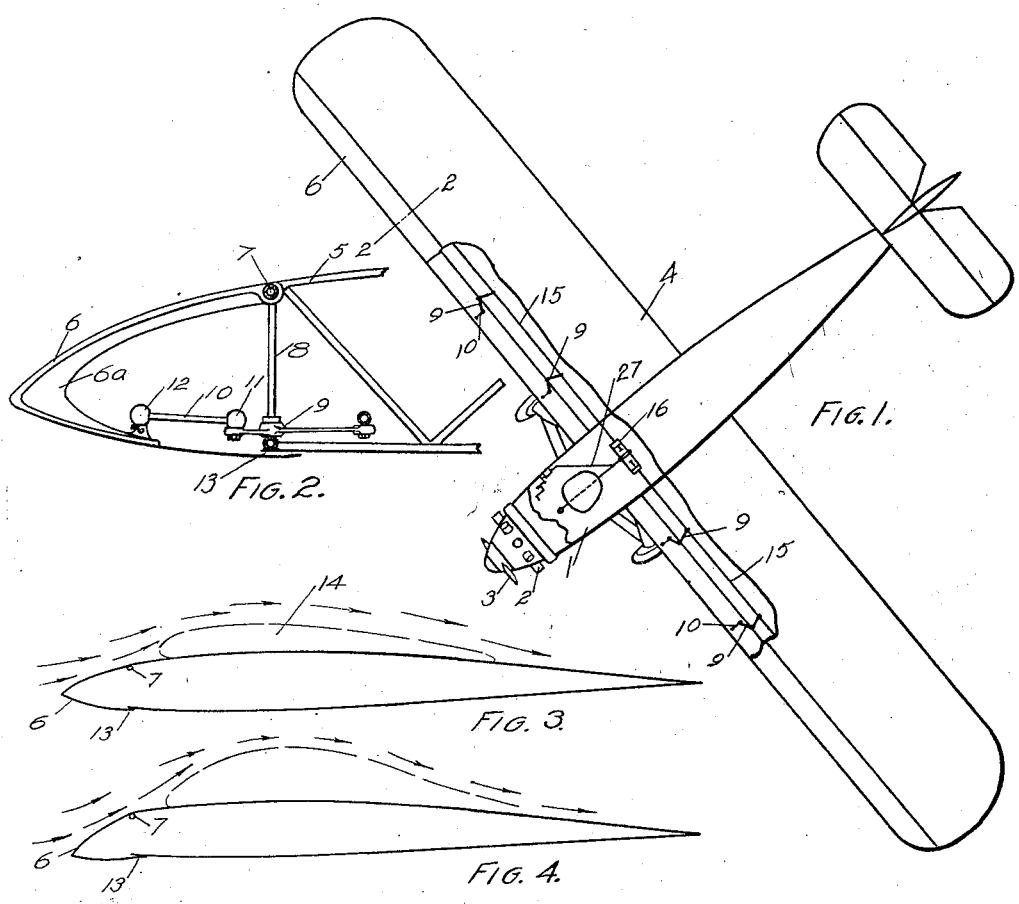
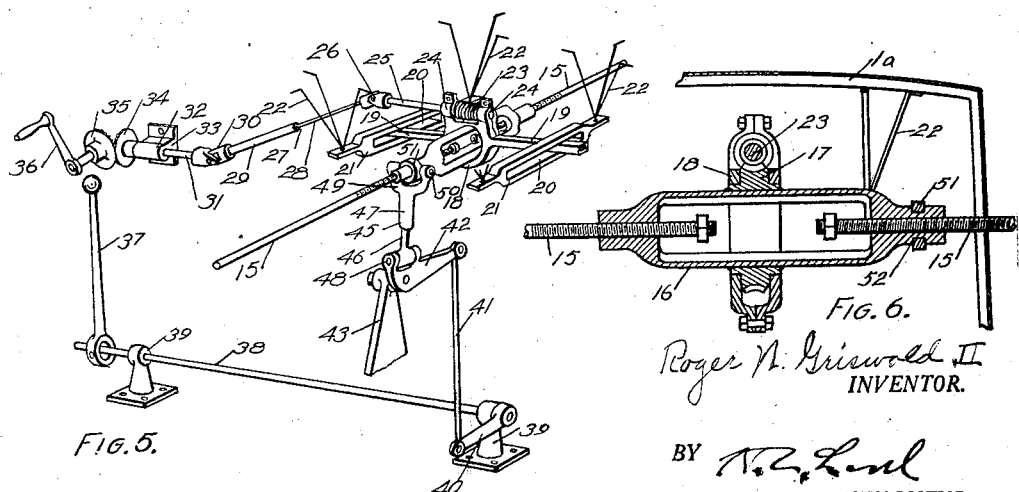
Roger N. Griswold II
INVENTOR.
BY
ATTORNEYS.

Patented June 17, 1930

1,763,888

UNITED STATES PATENT OFFICE

ROGER W. GRISWOLD, 2D, OF ERIE, PENNSYLVANIA

AEROPLANE

Application filed November 11, 1927. Serial No. 232,580.

Wing constructions of aeroplanes are usually a compromise. Of necessity they are so formed as to have a lifting capacity at comparatively slow speeds for take-offs and landings. The shape of wing to accomplish this purpose is not the most efficient shape of wing for the normal flying speeds. Consequently most aeroplanes are not so formed as to utilize their full power in getting into the air and on the other hand are not so formed as to utilize their full power in the development of speed. The present invention is designed to obviate this difficulty by forming the wing so that its form may be changed for take-off and landing from that of the normal running shape. Features and details of the invention will appear more fully from the specification and claims.

A preferred embodiment of the invention is illustrated in the accompanying drawings as follows:—

Fig. 1 shows a plan view of an aeroplane, a part being broken away to better show construction.

Fig. 2 a section on the line 2—2 in Fig. 1.

Fig. 3 an end view of a plane adjusted for normal running.

Fig. 4 an end view of a plane adjusted for take-off, or landing.

Fig. 5 a perspective view of the controls detached.

Fig. 6 a sectional view of a portion of the control.

1 marks the fuselage, 2 the motor, 3 the propeller and 4 the aeroplane wings. The aeroplane wings have a body 5 which is of rigid construction having a top and bottom shell with an intervening frame-work giving the wing its necessary rigidity and carrying strength. A leading edge 6 of the wing is formed of a top and bottom shell aproximately of a contour continuing the shell contour of the body portion 5. It is provided with a web 6ª stiffening the edge. The leading edge is hinged at 7 with a longitudinal hinge extending the full length of the wing and the hinge is arranged directly at one of the vertical struts 8 of the body and at the termination of one of the diagonal struts leading directly to the hinge.

A series of bell crank levers 9 are mounted on the struts 8 and these are connected by links 10 through ball and socket joints 11 and 12 with the bell crank 9 and the lower shell of the leading edge respectively. The lower shell of the leading edge overlaps at 13 the lower shell of the body. It will readily be seen that as the bell cranks are manipulated the leading edge may be lifted, or depressed, thus varying the shape of the leading edge relatively to the body of the wings as indicated in Figs. 3 and 4. With the leading edge as shown in Fig. 3 the stream deflection is indicated somewhat as shown in Fig. 3 and the lifting power at a given speed is considerably less than the lifting power in Fig. 4, but on the other hand, the reduced obstruction at the leading edge to movement results in an increased speed. On the other hand, with the depressed leading edge and greater deflection of air, as shown in Fig. 4, the low pressure area above the wing is increased and its lifting power thus increased at the expense of speed. Thus with this structure with a rigid wing body giving it the strength and carrying capacity with slight weight this variation in lifting and speed characteristics may be accomplished by a change of the leading edge alone.

Rods 15 extend from the bell cranks 9 and have screw-threaded ends which extend into a turn buckle 16. The turn buckle is provided with a worm gear 17. The worm gear, and with it the turn buckle, is journaled in bearings 18. The bearings are carried by arms 19 extending forward and back from the bearings into slots 20. The slots are carried by plates 21 and these plates are supported by hangers 22 suspended from the top 1ª of the fuselage. It will be seen, therefore, that the turn buckle while supported is in a measure floating, that is to say, it can move sidewise, or forward and back with the rods 15. A worm 23 operates the worm gear 17 and is journaled in bearings 24 extending from the bearings 18. A shaft 25 extends from the worm 23 and is connected by a universal joint 26 with a shaft 27. The shaft 27 is made up of telescopic members 28 and 29 connected by a universal joint 30 with a shaft 31. The shaft 31 is journaled in a bearing 32 carried by a bracket 33 on the fuselage. A beveled gear 34 is secured to the shaft 31. It meshes with a gear 35. The gear 35 is operated through a crank 36 in convenient location relatively to the seat of the operator. It will readily be seen that by operating the crank the turn buckle may be rotated and thus lift, or lower, the leading edges of the wings as desired.

A controlling stick 37 is fixed on a torque rod 38. The torque rod is journaled in bearings 39 secured to the fuselage. A rock arm 40 is arranged at the rear of the torque arm and a link 41 connects the rock arm 40 with a bell crank lever 42. The bell crank lever 42 is mounted on a post 43 on the fuselage and has an upright arm 45 which is formed of the telescopic members 46 and 47. The arm 45 is pivotally connected with the horizontal arm of the bell crank by a pin 48. Thus the arm 45 is locked with the horizontal arm of the bell crank lever so far as movement on the pivot of the bell crank lever is concerned. On the other hand, the upper end of the arm 45 is free to swing forward and back through the telescopic members to take care of the arc of movement of the upper end of the arm. Thus the arcuate movement of the connecting ends of the bell cranks with the rods 15 is permitted, the rods 15 moving forward and back and the arms 19 moving in the slots to accommodate this movement and the spring movement of the arm 45 of the bell crank also permitting this movement. The upper end of the arm 45 of the bell crank is provided with a fork 49 which is connected by pins 50 with a collar 51 operating in an annular groove 52 in the end of the turn buckle. It will be seen that through this mechanism a movement of the control lever to the right, or left, swings through the linkage described, the rock lever 42 and moves the turn buckle to the right, or left, and this movement lifts one leading edge of the plane while depressing the other. Thus the adjustable leading edges provide a complete control for the wings as well as a variable adjusting of the wings to the immediate conditions of use. The adjustment of the leading edges for the immediate type of running, take-off and landing, is set through the crank 36. The variation of one edge to the other for aeroplane control is handled through the usual control stick as just described. These two distinct controls operate independently and without interference from each other.

What I claim as new is:—

In an aeroplane, the combination of wings, each having a rigid wing body and a leading edge flexibly connected with the wing body and adapted to be depressed, or elevated, relatively to the body; control means actuating the leading edges of the wings, said means comprising a series of levers within the wing bodies; links connecting the levers with the leading edges; rods extending from the levers toward the center of the plane; and means operating the rods toward and from each other comprising screws on the rods, a turn buckle on the screws, a worm gear operating the turn buckle, a crank operating the gear, and a floating support for the turn buckle comprising slotted plates and arms extending from the turn buckle into the slots.

In testimony whereof I have hereunto set my hand.

ROGER W. GRISWOLD, II.